United States Patent [19]

Kanamaru et al.

[11] Patent Number: 5,262,146
[45] Date of Patent: Nov. 16, 1993

[54] METHOD FOR PRODUCING CARBON BLACK

[75] Inventors: Shinichi Kanamaru; Hideyuki Hisashi; Tadashi Hashiguchi; Akinori Sakaue, all of Kitakyushu, Japan

[73] Assignee: Mitsubishi Kasei Corporation, Tokyo, Japan

[21] Appl. No.: 862,171

[22] Filed: Apr. 2, 1992

[30] Foreign Application Priority Data

Apr. 2, 1991 [JP] Japan .................. 3-094946

[51] Int. Cl.$^5$ ............................................. C09C 1/48
[52] U.S. Cl. ................... 423/455; 423/458; 422/151
[58] Field of Search ............... 423/450, 451, 455, 458, 423/449.1; 425/445; 422/151, 150

[56] References Cited

U.S. PATENT DOCUMENTS

| | | | |
|---|---|---|---|
| 4,582,695 | 4/1986 | Dilbert et al. | 423/449.1 |
| 4,664,901 | 5/1987 | Henderson | 423/455 |
| 4,822,588 | 4/1989 | Gravley et al. | 423/455 |

FOREIGN PATENT DOCUMENTS

| | | | |
|---|---|---|---|
| 315442 | 5/1989 | European Pat. Off. | 423/450 |
| 412265 | 2/1991 | European Pat. Off. | 423/458 |

Primary Examiner—Michael Lewis
Assistant Examiner—Stephen G. Kalinchak
Attorney, Agent, or Firm—Oblon, Spivak, McClelland, Maier & Neustadt

[57] ABSTRACT

A method for producing carbon black by means of a horizontal carbon black production furnace having a first reaction zone in which a mixture of an oxygen-containing gas and a fuel is burned to form a high temperature gas stream, a second reaction zone in which a hydrocarbon feedstock is supplied and reacted with the high temperature gas stream formed in the first reaction zone, and a third reaction zone in which quenching water is sprayed into the gas mixture from the second reaction zone to terminate the reaction, wherein the second reaction zone is constructed to have a hollow cylindrical structure with at least two cylindrical sections having different inner diameters connected to one another and the hydrocarbon feedstock is divided for supply so that it is supplied to at least two locations including an upstream cylindrical section to which the hydrocarbon feedstock is first supplied and a cylindrical section located downstream thereof and so that the flow velocities of gases passing through the respective cylindrical sections are thereby mutually differentiated within a range of from 100 to 500 m/sec.

10 Claims, 2 Drawing Sheets

METHOD FOR PRODUCING CARBON BLACK

FIELD OF THE INVENTION

The present invention relates to a method for producing carbon blacks having various physical properties useful for various applications as filler materials, reinforcing materials, conductive materials, coloring pigments, etc., in good yields.

BACKGROUND OF THE INVENTION

Furnace carbon black is usually produced by a process in which a fuel is introduced in an axial or tangential direction of a cylindrical carbon black production furnace and burned; while transferring the formed high temperature combustion gas stream towards the downstream side, a hydrocarbon feedstock is introduced into the gas stream to let the reaction take place for the formation of carbon black; and then the formed carbon black-suspended hot gas stream is quenched to terminate the reaction. The formed carbon black is then collected and recovered by a collecting apparatus such as a cyclone or bagfilter.

Carbon black is used in various fields e.g. for producing rubber products, inks, coating materials, resin products, etc. The required properties such as the particle size and the aggregate size as well as the dibutyl phthalate absorption (hereinafter sometimes referred to as "DBP absorption"), the compression dibutyl phthalate absorption (hereinafter sometimes referred to as "compression DBP absorption") and their balance, as important indices for the structure, are delicately different depending upon the particular fields of applications. Therefore, it is necessary to control such physical property values to the desired levels depending upon the particular application, during the production stage of carbon black.

However, the thermal decomposition reaction for the formation of carbon black is complicated, and it has been very difficult to control the physical properties of carbon black to the desired levels within wide ranges and independently from one another and to efficiently produce carbon black.

For example, Japanese Unexamined Patent Publication No. 230677/1989 discloses a method for producing carbon black in which many and separate oil feedstock streams are supplied from separate portions to control the aggregate. In this method, the oil feedstock supply positions are changed to the upstream or the downstream of the gas stream in an oil feedstock injection zone of a conical shape to control the aggregate such as the aggregate size, whereby the structure is changed together with the change of the aggregate, and it is impossible to conduct the control of the aggregate and the control of the structure independently. Further, in this method, the cross sectional area in the reactor is not sufficiently utilized for mixing the high temperature gas and the oil feedstock, whereby the utilization efficiency of heat energy is low, and the yield of carbon black is low. This publication discloses nothing about the control of the structure balance represented by the compression DBP absorption/DBP absorption, which is an important characteristic of carbon black.

Further, Japanese Unexamined Patent Publication No. 190760/1989 discloses a method in which it is attempted to obtain a wider aggregate size distribution by injecting one of a plurality of oil feedstocks to a position where no increase of the compression DBP absorption will be brought about. However, the structure balance can not adequately be controlled by merely changing the position of the oil feedstock supply pipe of a later stage and the oil feedstock supply ratio between the earlier and later stages. Further, in this method, when the supply pipe for introducing the oil feedstock in the axial direction into the furnace is protected by quenching water, a loss of the heat energy generated in the first reaction zone will be brought about, and the production yield of carbon black will be low.

Thus, conventional methods for producing furnace carbon black used to rely only on the method of introducing the oil feedstock as a means to control the quality of the resulting carbon black, whereby it used to be difficult to sufficiently satisfy both aspects of the yield and wide control of the quality.

SUMMARY OF THE INVENTION

It is an object of the present invention to provide a method for producing furnace carbon black, whereby the quality of the product can be widely controlled while maintaining good yield.

As a result of various studies to solve the above problems, the present inventors have succeeded in accomplishing the present invention on the basis of a discovery that the following relation exists between the hydrodynamic parameters such as the flow velocity of gas in the production furnace, residence time, etc. and the compression DBP absorption/DBP absorption, the most frequent aggregate size and the yield of carbon black, which are particularly important among the quality characteristics of carbon black.

Compression DBP absorption/DBP absorption $\propto 1/V$

Most frequent aggregate size $\propto 1/Vc$, t

Yield of carbon black $\propto \eta$, t

Where, V, Vc, t and $\eta$ are as follows:

V: The average flow velocity of gas in the furnace at the hydrocarbon feedstock supply point.

Vc: The average flow velocity of gas in the furnace at the region having the minimum diameter in the furnace (i.e. the region usually referred to as a throat).

$\eta$: Mixing efficiency of the hydrocarbon feedstock with the high temperature combustion gas.

t: Residence time of gas in the furnace from the hydrocarbon feedstock supply point at the most upstream side to the outlet in the second reaction zone (provided that the residence time t is at least 1 msec).

The present invention provides a method for producing carbon black by means of a horizontal carbon black production furnace comprising a first reaction zone in which a mixture of an oxygen-containing gas and a fuel is burned to form a high temperature gas stream, a second reaction zone in which a hydrocarbon feedstock is supplied and reacted with the high temperature gas stream formed in the first reaction zone, and a third reaction zone in which quenching water is sprayed into the gas mixture from the second reaction zone to terminate the reaction, wherein the second reaction zone is constructed to have a hollow cylindrical structure with at least two cylindrical sections having different inner diameters connected to one another and the hydrocarbon feedstock is divided for supply so that it is supplied to at least two locations including an upstream cylindrical section to which the hydrocarbon feedstock is first supplied and a cylindrical section located downstream thereof and so that the flow velocities of gases passing through the respective cylindrical sections are thereby mutually differentiated within a range of from 100 to 500 m/sec. In the present specification, the "upstream cylindrical section to which the hydrocarbon feedstock is first supplied" means an "upstream cylindrical section to which the hydrocarbon feedstock is first supplied" to the gas mixture stream flowing in the carbon black production furnace.

DESCRIPTION OF THE PREFERRED EMBODIMENT

Figure 1:
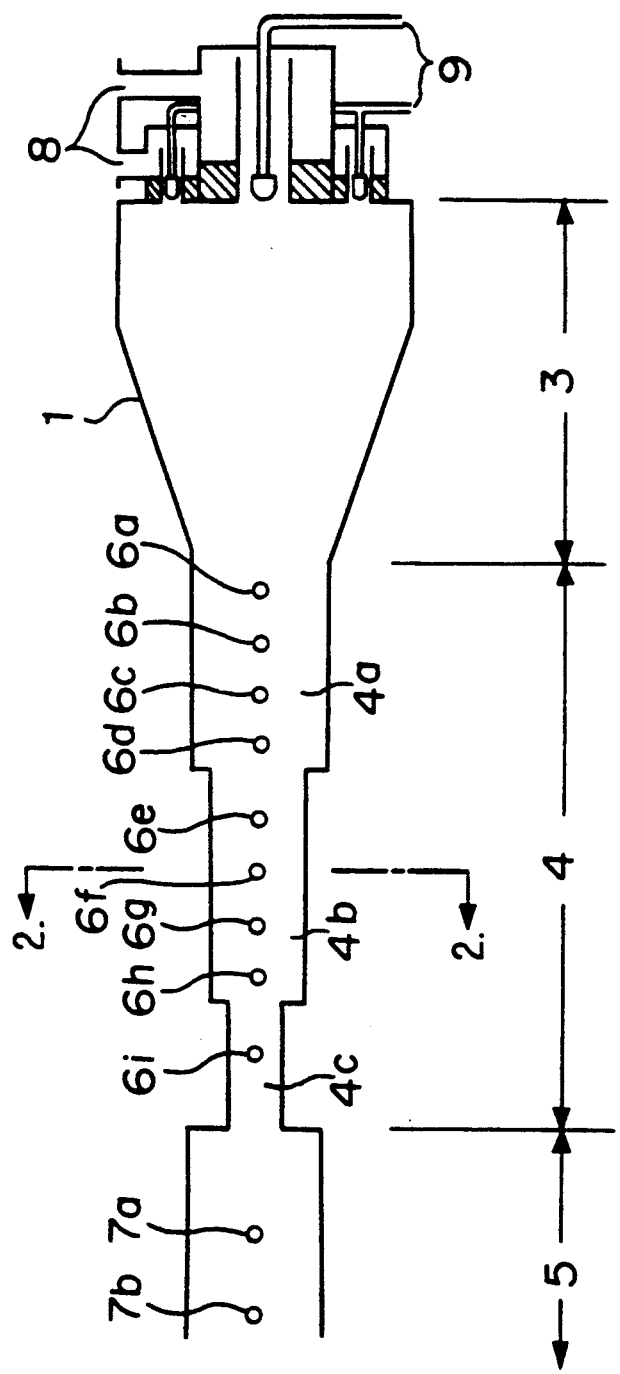
FIG. 1 is a diagrammatical vertical cross sectional view showing an embodiment of the carbon black production furnace used for carrying out the method of the present invention.

Now, the present invention will be described in detail with reference to the preferred embodiments.

In the present invention, the first reaction zone is usually constructed to have a hollow cylindrical structure having a uniform diameter or a hollow cylindrical structure with its downstream portion conically converged to some extent, and its inner diameter is usually equal to or slightly larger than the inner diameter of the maximum cylindrical section in the second reaction zone. The oxygen concentration in the combustion gas in the first reaction zone is usually from 3 to 10% by volume, and the temperature of the combustion gas is usually from 1,000° to 1,900° C., preferably from 1,500° to 1,800° C.

In the present invention, the second reaction zone is constructed to have a hollow cylindrical structure with at least two cylindrical sections having different inner diameters connected to one another, whereby the average flow velocity V of gas in the furnace at the hydrocarbon feedstock supply point, the flow velocity Vc of gas in the throat and the residence time t of gas in the furnace from the hydrocarbon feedstock supply point at the most upstream side to the outlet in the second reaction zone, can readily be controlled depending upon the desired quality of carbon black to be produced, by properly adjusting the diameters and lengths of the respective cylindrical sections, the number of cylindrical sections, the positions at which the hydrocarbon feedstock is supplied and the manner in which the hydrocarbon feedstock is supplied in a divided fashion. The number of cylindrical sections having different inner diameters, which are connected to one another, is at least two, usually two or three. The inner diameters of the respective cylindrical sections usually gradually decrease towards the downstream.

The hydrocarbon feedstock is supplied in an amount of 10 to 90% by weight, preferably from 20 to 80% by weight, of the total amount to the upstream cylindrical section to which the hydrocarbon feedstock is first supplied, and the rest is supplied to one or more cylindrical sections located downstream thereof. The positions at which the hydrocarbon feedstock is supplied and the amounts supplied are controlled depending upon the desired properties of carbon black. The hydrocarbon feedstock may be supplied in a divided fashion at several positions of the upstream and the downstream cylindrical sections also within the same cylindrical section. Supply of the hydrocarbon feedstock to the respective cylindrical sections is conducted by properly selecting hydrocarbon feedstock supply nozzles provided at the circumference of the cylindrical sections. The number of nozzles provided is usually from 2 to 10, preferably from 2 to 4, in total. They are preferably provided at substantially equal distances along the gas stream. The distances between the respective nozzles are preferably from 2 to 4 msec in terms of the residence time of the gas stream.

As described above, the hydrocarbon feedstock is supplied in a divided fashion at at least two locations including the upstream cylindrical section and a cylindrical section located downstream thereof. The flow velocity of gas in the upstream cylindrical section to which the hydrocarbon feedstock is first supplied, is usually within the range of from 100 to 200 m/sec. The hydrocarbon feedstock is preferably introduced at the position whereby the residence time in the cylindrical section can be maintained for at least 2 msec, so that the introduced hydrocarbon feedstock can be distributed as quickly as possible to the entire cross-section of the furnace. In the present invention, the hydrocarbon feedstock is divided for supply at least at two locations of the upstream and the downstream sections and differing in flow velocity, whereby the residence time of the hydrocarbon feedstock in the second reaction zone can be changed and adjusted, and the compression DBP absorption/DBP absorption, the aggregate size, etc. of the resulting carbon black, can readily be controlled, by changing and adjusting the positions of the divided supply and the proportions of supply.

In the present invention, flow velocities of gases passing through the respective cylindrical sections in the second reaction zone are controlled to be within a range of from 100 to 500 m/sec, preferably from 150 to 400 m/sec. In general, if the flow velocities of gases passing through the respective cylindrical sections are too high, dispersion of the sprayed hydrocarbon feedstock into the gas stream tends to be inadequate, whereby the yield of the resulting carbon black tends to be low. On the other hand, if the gas velocities are too low, dispersion of the hydrocarbon feedstock tends to be non-uniform, whereby it becomes difficult to conduct the operation under a stabilized condition.

The flow velocities of gases in the respective cylindrical sections will be described in detail. The flow velocity of gas in the upstream cylindrical section to which the hydrocarbon feedstock is first supplied, is usually from 100 to 500 m/sec, preferably from 100 to 200/sec. The flow velocity is usually adjusted to be high at a downstream cylindrical section. Namely, the flow velocity of gas in the second cylindrical section next to the upstream cylindrical section, is usually from 1.2 to 5 times, preferably from 1.5 to 3 times, the flow velocity of gas in said upstream cylindrical section. Further, the flow velocity of gas in a further downstream cylindrical section (if provided) is adjusted to be higher than the flow velocity of gas in the second cylindrical section. The compression DBP absorption/DBP absorption of the resulting carbon black can be adjusted also by controlling the flow velocities of gases passing through the respective cylindrical sections.

The residence time of the gas stream in the upstream cylindrical section to which the hydrocarbon feedstock is first supplied, is usually at least 2 msec, preferably from 4 to 6 msec. Further, the residence time of the gas entering into the second cylindrical section, is usually at least 2 msec, preferably from 2 to 10 msec. The most downstream cylindrical section usually has the smallest inner diameter and is usually called a throat.

In the present invention, the flow velocities of gases passing through the respective cylindrical sections in the second reaction zone are controlled within a range of from 100 to 500 m/sec, preferably from 150 to 400 m/sec, in particular, the low velocity of gas passing through the lower end of the upstream cylindrical section to which the hydrocarbon feedstock is first supplied, is controlled within a range of from 100 to 200 m/sec, and the residence time of the hydrocarbon feedstock first supplied to the upstream cylindrical section, in the upstream cylindrical section, is preferably maintained to be at least 2 msec, whereby the high temperature combustion gas and the hydrocarbon feedstock can efficiently be mixed, and part of the hydrocarbon feedstock and oxygen are reacted to efficiently form carbon black while minimizing consumption of carbon.

Namely, the reactions between the hydrocarbon feedstock and oxygen contained in the high temperature combustion gas include reactions which consume carbon, as represented by the formula $C + \frac{1}{2}O_2 \rightarrow CO$ and the formula $C + O_2 \rightarrow CO_2$ and a reaction which does not consume carbon, as represented by the formula $H_2 + \frac{1}{2}O_2 \rightarrow H_2O$. When the reaction is conducted under the above mentioned operational conditions to improve the mixing efficiency of the high temperature combustion gas and the hydrocarbon feedstock, it is possible to minimize the reactions which consume carbon and to efficiently generate a heat energy required for the formation of carbon black, mainly by the reaction which does not substantially consume carbon. Therefore, formation of carbon black can effectively be conducted even when a hydrocarbon is continuously supplied at the downstream, whereby a wide range of quality control of carbon black is possible.

Now, the third reaction zone in the present invention is a zone wherein a high temperature gas mixture containing formed carbon black, flowing out from the final cylindrical section of the second reaction zone (i.e. the cylindrical section which is usually called a throat), is received and cooled by quenching water sprayed, to terminate the reaction. The flow velocity of gas in this zone is usually equal to or higher than the flow velocity of gas in the final cylindrical section of the second reaction zone. The temperature of the gas mixture cooled in this third reaction zone is usually from 500° to 1,400° C., preferably from 800° to 1,000° C.

As the fuel for generating the high temperature combustion gas in the present invention, a gaseous fuel such as hydrogen, carbon monoxide, methane, natural gas, coal gas or petroleum gas; a petroleum-originated liquid fuel such as kerosine, gasoline or heavy oil; or a coal-originated fuel such as creosote oil, naphthalene oil or carboxylic acid oil, may suitably be employed.

As the hydrocarbon feedstock in the present invention, an aromatic hydrocarbon such as benzene, toluene, xylene, naphthalene or anthracene; a coal-originated hydrocarbon such as creosote oil or carboxylic acid oil; a petroleum-originated heavy oil such as ethylene heavy oil or FCC oil; an acetylene-type unsaturated hydrocarbon; and ethylene-type hydrocarbon; or an aliphatic hydrocarbon such as pentane or hexane, may suitably be employed.

Figure 2:
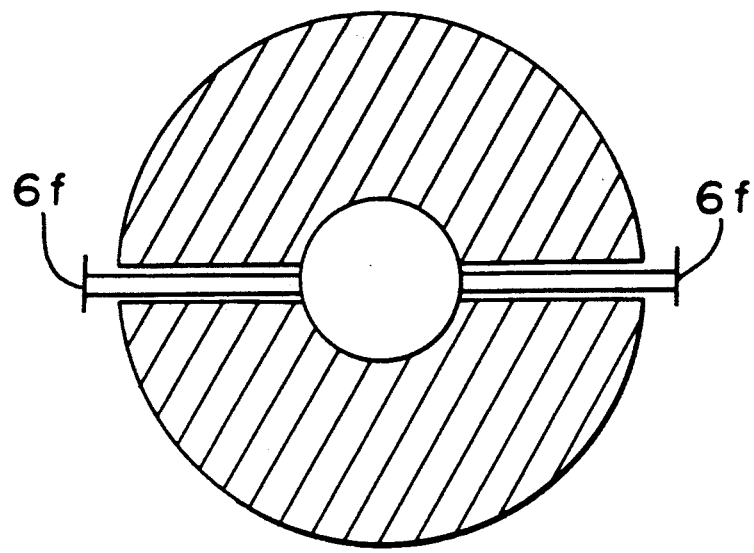
FIG. 2 is a diagrammatical cross sectional view taken along line A—A of FIG. 1.
Figure 3:
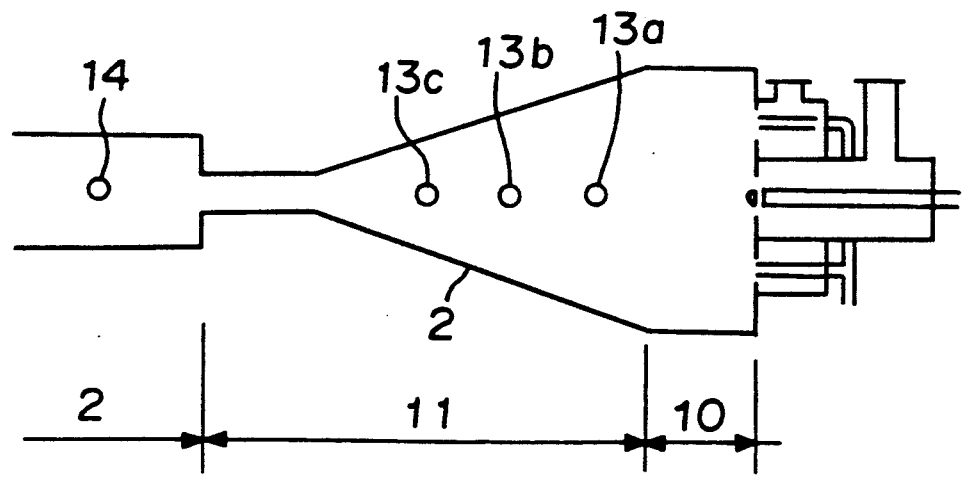
FIG. 3 is a diagrammatical vertical cross sectional view illustrating an embodiment of the conventional furnace carbon black production furnace.

Now, the present invention will be described in detail with reference to the accompanying drawings. FIG. 1 is a diagrammatical vertical cross-sectional view showing an embodiment of the carbon black production furnace used in the present invention; FIG. 2 is a diagrammatical cross-sectional view taken along line A—A of FIG. 1; and FIG. 3 is a diagrammatical vertical cross-sectional view showing an embodiment of the conventional carbon black production furnace.

In FIG. 1, reference numeral 1 indicates the main body of the production furnace, and an oxygen-containing gas and a fuel supplied from an oxygen-containing gas inlet 8 and fuel nozzles 9, are burned in the first reaction zone 3 to form a high temperature combustion gas stream. The high temperature combustion gas stream thus formed in the first reaction zone, will then flow into a second reaction zone 4 located downstream thereof.

The second reaction zone 4 is constituted by three cylindrical sections 4a, 4b and 4c having inner diameters different from one another, and these cylindrical sections are arranged so that the inner diameters gradually decrease towards the downstream section. The cylindrical sections 4a to 4c have diameters such that the flow velocities of gases in the furnace are within the range of from 100 to 500 m/sec, preferably from 150 to 400 m/sec, and the cylindrical sections 4a and 4b have lengths in the axial direction such that the flow velocities of gases flowing therein would have residence times of at least 2 msec, preferably at least 5 msec.

In the second reaction zone 4, hydrocarbon feedstock nozzles 6a to 6i are provided in a plurality of stages, and each stage of nozzles is constituted by a pair of nozzles at the right and left hand sides, as shown in FIG. 2. The respective nozzles 6a to 6i are disposed so that each nozzle is able to eject the hydrocarbon feedstock in a direction traversing the furnace axis. A part of the hydrocarbon feedstock is first supplied from nozzles provided in the upstream cylindrical section 4a or 4b, and the rest of the hydrocarbon feedstock is supplied from nozzles provided in the cylindrical sections 4b and/or 4c located downstream thereof. The boundary between the first reaction zone 3 and the second reaction zone 4 in the production furnace shown in FIG. 1, is not a boundary in a strict sense. Namely, such a boundary moves depending upon the mode of actual operation of this production furnace. In other words, the upstream section of the nozzles from which the hydrocarbon feedstock is first supplied into this production furnace, constitutes the first reaction zone 3 and the downstream section of the nozzles constitutes the second reaction zone 4.

When the hydrocarbon feedstock is first supplied to the most upstream cylindrical section 4a, it is advisable to select nozzles at such positions that the residence time of the supplied hydrocarbon feedstock in the cylindrical section 4a would be at least 2 msec. The hydrocarbon feedstock may be supplied in a divided fashion at two or more locations including the upstream and the downstream section within the cylindrical section 4a. Likewise, when the hydrocarbon feedstock is first supplied in the next cylindrical section 4b, it is advisable to select nozzles located at such positions that the residence time in the cylindrical section 4b is at least 2 msec. Further, the hydrocarbon feedstock may be supplied in a divided fashion at two or more locations including the upstream and the downstream sides within the cylindrical section 4b.

Then, hydrocarbon feedstock supply nozzles in the cylindrical sections 4b and/or 4c as the downstream cylindrical sections, it is preferred to select nozzles located at a distance corresponding to a gas residence time difference within a range of from 1 to 5 msec, preferably from 2 to 4 msec, from the nozzles to which the hydrocarbon is first supplied in the cylindrical section 4a or 4b. Thus, by supplying the hydrocarbon feedstock in a divided fashion from at least two locations differing in the position relative to the gas stream, it is possible to effectively control the structure balance without giving influencing the aggregate size of the resulting carbon black. The divided supply of the hydrocarbon feedstock is usually conducted in at least two stages, preferably from 2 to 5 stages.

Spraying angles of nozzles from which the hydrocarbon feedstock is supplied to the cylindrical section 4, are as wide as possible, usually at least 30°, preferably at least 60°, in the case of nozzles for supply at the most upstream section.

The reaction product thus obtained by introducing the hydrocarbon feedstock into high temperature combustion gas stream in the second reaction zone 4 to conduct the carbon black-forming reaction, is then introduced into the third reaction zone 5 via the cylindrical section 4c having the smallest inner diameter, and quenched by water sprayed from water sprays 7a and/or 7b for termination of the reaction, to terminate the reaction, whereupon it is introduced into a collecting apparatus such as a cyclone or a bagfilter, not shown, whereby carbon black is collected and recovered.

The carbon black production furnace shown in FIGS. 1 and 2 is one example of the production furnace useful for the present invention, and this production furnace may be changed into various embodiments. Especially, the number of cylindrical sections in the second reaction zone, the diameters of the respective cylindrical sections, the number of hydrocarbon feedstock supply nozzles, etc. may suitably be changed depending upon the desired properties of carbon black to be produced.

FIG. 3 is a diagrammatical vertical cross-sectional view showing an embodiment of the conventional furnace carbon black production furnace, and this production furnace was used in the following Comparative Examples for the production of carbon black.

Now, the present invention will be described in further detail with reference to Examples and Comparative Examples. However, it should be understood that the present invention by no means restricted by such specific Examples. The physical properties of carbon blacks disclosed in these Examples, were measured by the following test methods.

(1) Iodine adsorption
Measured in accordance with JIS K6221-1982.
(2) DBP absorption
Measured in accordance with JIS K6221-1982.
(3) Compression DBP absorption
25 g of a test sample was put into a cylinder, a piston was inserted, and a pressure of 24,000 psi (1,687 kg/cm$^2$) was imparted by a hydraulic press for 5 seconds. After the pressing, the test sample was taken out and transferred to a sieve of 1,000μ, and the carbon block was loosened and sieved. This operation was repeated four times, and with respect to the test sample thus treated, the DBP absorption was measured in accordance with JIS K6221-1982 and taken as compression DBP absorption.

(4) Particle size and particle size distribution
Sample carbon black was put in chloroform and dispersed by irradiation with supersonic waves of 200 kHz for 20 minutes. Then, the dispersed sample was fixed on a support film. The fixed sample was observed by an electron microscope, and the particle size by arithmetic mean and the standard deviation were calculated and represented by Å.

(5) Aggregate size and aggregate size distribution
Five mg of carbon black was added to a 20% ethanol aqueous solution containing a small amount of a dispersant and completely dispersed by supersonic treatment. A rotary disk having 10 ml of a spinning liquid (water) injected, was adjusted to 8,000 rpm, and 0.5 ml of the above dispersion was injected. The turbidity detected by photo electric photometry was recorded by a histogram relative to the time. The most frequented particle size of the frequency distribution curve thereby obtained was represented by Å as the aggregate size ($D_{mod}$), and the half width of the frequency distribution curve was represented by mμm as the aggregate distribution ($D_{\frac{1}{2}}$).

EXAMPLE 1

In this Example 1, production of carbon black was conducted by means of the carbon black production furnace as shown in FIGS. 1 and 2 of the accompanying drawings. The sizes of the main parts of the carbon black production furnace were as follows:

First reaction zone 3

Length: 1,500 mm
Maximum inner diameter: 1,400 mm

Second reaction zone 4 length: 2,000 mm
Number of cylindrical sections having different inner diameters: 3
Diameter of cylindrical section 4a: 250 mm
Length of cylindrical section 4a: 500 mm
Diameter of cylindrical section 4b: 200 mm
Length of cylindrical section 4b: 1,000 mm
Upstream side hydrocarbon feedstock nozzles used: 6f, 6f
Length of cylindrical section 4c: 500 mm
Diameter of cylindrical section 4c: 150 mm
Downstream side hydrocarbon feedstock nozzles used: 6i, 6i Third reaction zone 5

Inner diameter: 400 mm
Water spray used: 7a

Namely, by using the above carbon black production furnace and the following fuel and hydrocarbon feedstock, carbon black was produced under the production conditions as identified in Table 1.

Fuel

Type of the fuel: Heavy oil
Specific gravity (150° C.): 0.99
Carbon content (% by weight): 85.5
Hydrogen content (% by weight): 10.3

Hydrocarbon feedstock

Type of the hydrocarbon feedstock: Creosote oil
Specific gravity (150° C.): 1.10
Carbon content (% by weight): 90.5
Hydrogen content (% by weight): 6.3

The physical properties and the yield of carbon black thereby obtained were as shown in Table 3.

EXAMPLE 2

Carbon black was produced in the same manner as in Example 1 except that the amount of the feedstock introduced at the upstream side was reduced as compared with Example 1, and instead, the amount of the feedstock introduced at the downstream side was increased, as shown in Table 1.

The purpose of increasing the amount of the feedstock introduced at the downstream side in this Example, is to introduce a large amount of the hydrocarbon feedstock at a location where the flow velocity of the gas in the furnace is high, so as to reduce the compression DBP absorption/DBP absorption. This Example is an example wherein the residence time difference in the second reaction zone as between the feedstock introduced at the upstream side and the feedstock introduced at the downstream side, is controlled to be not more than 4 msec, so as not to change $D_{mod}$ of the aggregate size (the actual residence time difference of the above hydrocarbon feedstocks was 3.6 msec). As is evident from Table 3, it was possible to substantially reduce the compression DBP absorption/DBP absorption in spite of the fact that $D_{mod}$ was substantially the same as compared with carbon black obtained in Example 1.

EXAMPLE 3

As shown in Table 1, the feedstock supply nozzles at the upstream side were changed to the upstream section as compared with the case of Example 2. Accordingly, the residence time in the second reaction zone of the feedstock introduced at the upstream side was prolonged. In this case, the residence time difference in the second reaction zone between the upstream and the downstream feedstocks, became large, whereby it was possible to produce carbon black having remarkably large $D_{mod}$ in spite of the fact that the compression DBP absorption/DBP absorption was substantially the same as compared with the case of Example 2, as shown in Table 3.

TABLE 1

| Examples | Example 1 | Example 2 | Example 3 |
|---|---|---|---|
| Production conditions for carbon black | | | |
| Flow rate of air (Nm³/hr) | 3,100 | 3,100 | 3,100 |
| Preheating temp. of air (°C.) | 397 | 401 | 401 |
| Flow rate of fuel (kg/hr) | 200 | 200 | 200 |
| Temp. of gas at the outlet of the 1st reaction zone (°C.) | 1,728 | 1,723 | 1,725 |
| Feedstock supply nozzles (Distance from the outlet of the 2nd reaction zone, mm) | 6f (1,050) | 6f (1,050) | 6e (1,400) |
| Amount of feedstock supplied at the upstream side (kg/hr) | 800 | 500 | 500 |
| Feedstock supply nozzles at the downstream side (Distance from the outlet of the 2nd reaction zone, mm) | 6i (300) | 6i (300) | 6i (300) |
| Amount of feedstock supplied at the downstream side (kg/hr) | 350 | 700 | 710 |
| Amount of feedstock supplied at the downstream side/total amount of feedstock supplied × 100 (%) | 30 | 58 | 59 |
| Flow velocity of gas in the furnace at the feedstock supply point at the downstream side (m/sec) | 310 | 310 | 310 |
| Flow velocity of gas in the furnace at the feedstock supply point at the upstream side (m/sec) | 180 | 180 | 180 |
| Flow velocity of gas at the outlet of the 2nd reaction zone (m/sec) | 310 | 310 | 310 |
| Residence time of the feedstock at the downstream side in the 2nd reaction zone (msec) | 0.95 | 0.95 | 0.95 |
| Residence time of the feedstock at the upstream side in the 2nd reaction zone (msec) | 4.6 | 4.6 | 7.0 |
| Residence time of the feedstock at the upstream side in the cylindrical section 4b (msec) | 3.0 | 3.0 | 5.0 |

COMPARATIVE EXAMPLES 1 AND 2

In these Comparative Examples, carbon blacks were produced under the production conditions as identified in Table 2 by means of the conventional carbon black production furnace as shown in FIG. 3. The sizes of the main parts of the carbon black production furnace were as follows:

First reaction zone 10

Length: 1,200 mm
Maximum inner diameter: 1,400 mm

Second reaction zone 11

Length: 2,800 mm
Maximum inner diameter: 1,400 mm
Minimum inner diameter: 170 mm Third reaction zone 12

Inner diameter: 400 mm
Water spray 14 used: one spray

In Comparative Example 1, the hydrocarbon feedstock was introduced from nozzles 13c, and in Comparative Example 2, the feedstock was introduced from nozzles 13a. The physical properties of carbon blacks thereby obtained were as shown in Table 3.

TABLE 2

| Examples | Comparative Example 1 | Comparative Example 2 |
|---|---|---|
| Production conditions for carbon black | | |
| Flow rate of air (Nm³/hr) | 3,100 | 3,900 |
| Preheating temp. of air (°C.) | 408 | 408 |
| Flow rate of fuel.(kg/hr) | 200 | 250 |
| Temp. of gas at the outlet of the 1st reaction zone (°C.) | 1,705 | 1,710 |
| Feedstock supply nozzles (Distance from the outlet of the 2nd reaction zone, mm) | 13c (550) | 13a (910) |
| Amount of feedstock (kg/hr) | 1,100 | 1,600 |
| Flow velocity of gas in the furnace at the feedstock supply point (m/sec) | 200 | 55 |
| Flow velocity of gas in the furnace at the outlet of the 2nd reaction zone (m/sec) | 240 | 290 |
| Residence time of feedstock in the 2nd reaction zone (msec) | 2.1 | 5.9 |

The physical properties and the yields of carbon blacks obtained in Examples and Comparative Examples are shown in Table 3.

TABLE 3

| Examples | Example 1 | Example 2 | Example 3 | Comparative Example 1 | Comparative Example 2 |
| --- | --- | --- | --- | --- | --- |
| Physical properties and yield of carbon black | | | | | |
| Compression DBP absorption (ml/100 g) | 91.0 | 92.0 | 91.0 | 89.9 | 89.1 |
| DBP absorption (ml/100 g) | 110 | 123 | 120 | 112 | 122 |
| Compression DBP absorption/DBP absorption | 0.83 | 0.75 | 0.76 | 0.80 | 0.73 |
| Aggregate size ($D_{mod}$) (m$\mu$) | 103 | 104 | 120 | 116 | 150 |
| Iodine adsorption (mg/g) | 64 | 65 | 62 | 59 | 62 |
| Aggregate size distribution ($D_{1/2}$) (m$\mu$) | 33.4 | 34.0 | 33.0 | 34.4 | 34.1 |
| Yield of carbon black (%) | 72.0 | 71.0 | 74.0 | 66.5 | 69.0 |

It is evident from comparison between Comparative Examples 1 and 2 in Tables 2 and 3, even if the hydrocarbon feedstock supply points are changed in the conventional second reaction zone of a conical shape, the residence time of the feedstock in the furnace and the flow velocity of the gas in the furnace tend to be changed simultaneously, whereby both the compression DBP absorption/DBP absorption and the aggregate size tend to change, and it is impossible to control them independently.

Whereas, from comparison of Examples 1 to 3 in Tables 1 and 3, it is evident that in the present invention, the compression DBP absorption/DBP absorption and the aggregate size can independently be controlled by changing the positions of the feedstock supply nozzles at the upstream side and the proportions of the feedstock introduced at the upstream side and the downstream side.

Further, in Comparative Examples 1 and 2, the shape of the reaction zone is conical, whereby the residence time of at least 2 msec at the same velocity, can not be maintained, and the yield of carbon black is low. Whereas, in the Examples of the invention, the reaction zone is constituted by at least two hollow cylindrical sections having different inner diameters, connected to one another, whereby it is readily possible to maintain the residence time of at least 2 msec at the same flow velocity, and it is possible to produce carbon black having a small aggregate size in good yield.

According to the present invention, it is possible to control the physical properties of the resulting carbon black, particularly the desired values of the compression DBP absorption/DBP absorption and the aggregate size within wide ranges, whereby carbon blacks having various physical properties suitable for any particular purposes, can be produced in good yields.

We claim:

1. A method for producing carbon black by means of a horizontal carbon black production furnace comprising a first reaction zone in which a mixture of an oxygen-containing gas and a fuel is burned to form a gas stream, a second reaction zone in which a hydrocarbon feedstock is supplied and reacted with the gas stream formed in the first reaction zone, and a third reaction zone in which quenching water is sprayed into the gas mixture from the second reaction zone to terminate the reaction, wherein the second reaction zone is constructed to have a hollow cylindrical structure with at least two cylindrical sections having different inner diameters connected to one another and the hydrocarbon feedstock is divided for supply so that it is supplied to at least two locations including an upstream cylindrical section to which the hydrocarbon feedstock is first supplied and a cylindrical section located downstream thereof and so that the flow velocities of gases passing through the respective cylindrical sections are thereby mutually differentiated within a range of from 100 to 500 m/sec.

2. The method according to claim 1, wherein the flow velocity of gas in the upstream cylindrical section to which the hydrocarbon feedstock is first supplied, is from 100 to 200 m/sec, and the residence time of said gas in that cylindrical section is at least 2 msec.

3. The method according to claim 1, wherein the first reaction zone is constructed to have a cylindrical structure having an inner diameter equal to or larger than the inner diameter of the maximum cylindrical section of the second reaction zone, and the high temperature gas stream in the first reaction zone has an oxygen content of from 3 to 10% by volume and a temperature of from 1,000° to 1,900° C.

4. The method according to claim 1, wherein the inner diameters of the cylindrical sections connected to constitute the second reaction zone decrease from the upstream section towards the downstream section.

5. The method according to claim 1, wherein from 10 to 90% by weight of the hydrocarbon feedstock is supplied to the upstream cylindrical section, and the rest of the hydrocarbon is supplied to one or more cylindrical sections located downstream thereof.

6. The method according to claim 1, wherein the flow velocities of gases passing through the respective cylindrical sections in the second reaction zone are controlled within the range of from 100 to 500 m/sec.

7. The method according to claim 6, wherein the flow velocities of gases increase from the upstream cylindrical section towards the downstream section thereof.

8. The method according to claim 1, wherein the residence time of said gas stream in the second cylindrical section is from 2 to 10 msec.

9. The method according to claim 1, wherein the flow velocity of gas in the third reaction zone is equal to or higher than the flow velocity of gas in the final cylindrical section in the second reaction zone.

10. The method according to claim 1, wherein the gas mixture in the third reaction zone is quenched to a temperature of from 500° to 1,400° C.

* * * * *